United States Patent
Naresh et al.

(10) Patent No.: US 8,584,142 B1
(45) Date of Patent: Nov. 12, 2013

(54) METHODS AND SYSTEM FOR PROXY COMPONENT TO PERFORM PLURALITY OF OPERATIONS FOR APPLYING TO AN OBJECT

(75) Inventors: Rakshith Naresh, Bangalore (IN); Jayesh Viradiya, Gujarat (IN); Sanjeev Kumar, Karnataka (IN)

(73) Assignee: Adobe Systems Incorporated, San Jose, CA (US)

(*) Notice: Subject to any disclaimer, the term of this patent is extended or adjusted under 35 U.S.C. 154(b) by 452 days.

(21) Appl. No.: 12/608,349

(22) Filed: Oct. 29, 2009

(51) Int. Cl.
*G06F 9/44* (2006.01)
*G06F 9/46* (2006.01)

(52) U.S. Cl.
USPC .......................................... 719/316; 718/101

(58) Field of Classification Search
None
See application file for complete search history.

(56) References Cited

U.S. PATENT DOCUMENTS

| 5,898,834 A * | 4/1999 | Sharpe et al. ................ 709/201 |
| 6,341,311 B1 * | 1/2002 | Smith et al. ................... 709/226 |
| 7,496,932 B2 * | 2/2009 | Broussard et al. ............ 719/330 |
| 2003/0055862 A1 * | 3/2003 | Bhat ............................. 709/101 |

* cited by examiner

*Primary Examiner* — Camquy Truong
(74) *Attorney, Agent, or Firm* — Kilpatrick Townsend & Stockton LLP

(57) ABSTRACT

A server side scripting language hosts batch requests from a client for invoking object specific libraries on the client requestor. The requestor executes a user application driven by a web scripting language which may not have facilities or resources for efficiently invoking operations that are provided by the server. A batch script enables the requestor to invoke a set of server operations in batch, without exchanging requests and result for each invocation of a service side operation, thus mitigating the bandwidth that would otherwise occur for individual client/server exchanges for each operation. The server provides a proxy class for expected object types and operations, and a dispatch layer identifies the appropriate proxy class for each operation requested from the batch script.

20 Claims, 7 Drawing Sheets

METHODS AND SYSTEM FOR PROXY COMPONENT TO PERFORM PLURALITY OF OPERATIONS FOR APPLYING TO AN OBJECT

BACKGROUND

In a managed application environment, scripting languages are often employed for leveraging an object oriented architecture to invoke operations for computations and manipulations on a remote server. Typically, such a remote server is invoked for computationally intensive tasks that are performed more efficiently on the server than directly on the node or client invoking the remote server. Scripting languages such as ECMA script (European Computer Manufacturers Association, an international standards organization) have been developed for supporting a managed application environment. Users execute applications in the environment for performing various tasks on objects such as pdf files, images, documents, and others. Web scripting languages provide features for manipulating objects and invoking operation over a network, allowing the user to employ the application on behalf of data objects over the network.

With the modern trend toward graphically intensive user interfaces, and the user demand for video and audio manipulation capabilities, applications tend to invoke computationally expensive manipulations to present sophisticated sound and video. Further, modern applications frequently invoke security operations such as watermarking and encryption which require mathematical permutations on long byte strings, also increasing bandwidth and processing demands. Often, web scripting languages are called upon to drive these bandwidth hungry applications. The web scripting applications allow flexible usage from remote locations, and often invoke remote libraries for computationally intensive tasks. The remote libraries defer computationally expensive operations to a common server, alleviating the need for each individual web scripting application, or client, to maintain a robust set of processing libraries for operations such as watermarking, image processing, encryption, and other computationally expensive operations.

SUMMARY

Software applications, such as so-called Rich Internet Applications (RIAs), which are web script applications that generally have the features and functionality of traditional desktop applications, often include client and server portions for respective execution on client and remote server nodes. Such RIAs typically form a stateful client application on a user machine having a separate services layer on the backend. The client application renders a GUI (graphical user interface) for gathering and presenting data, and the backend communicates with the server for deferring computationally intensive operations.

More recently, web scripting languages such as ActionScript,® marketed commercially by Adobe Systems Incorporated, of San Jose, Calif., have been introduced to emphasize operations for supporting high bandwidth operations such as those required for multimedia applications. Accordingly, multimedia applications often employ ActionScript, a powerful, object-oriented programming language that interoperates with well-known multimedia rendering facilities such as Flash Player runtime. Such languages are ideally suited for rapidly building rich Internet applications, which have become increasingly popular as part of a user web experience.

In the managed application environment, a conventional server typically provides a library of operations for performing these computationally intensive and high bandwidth operations. Often, a server side language may be employed for invoking the library of operations on behalf of requesting clients. In a particular configuration, the Adobe® ColdFusion® scripting language, also marketed commercially by Adobe, may be employed. Such a server side language provides scripts and applications that allow invocation of operations that may not be available on the client, and are configured to perform operations such as image manipulations, database queries and traversals, security features such as encryption and watermarking, and other computationally demanding functions.

In an example configuration, the ColdFusion markup language (CFML) server-side scripting language implements ActionScript proxy classes for the popular ColdFusion tags (CFML tags) that are available on the server side. CFML tags that invoke operations on pdf files, images, charts, documents, and email functions have corresponding proxy classes defined in ActionScript. These tags can be used as MXML tags on the client side similar to ColdFusion tags on the server side. The ActionScript proxy classes talk to the functionality exposed on the server side by passing the input parameters to the server side. The server side then returns the result back to the client.

Conventional web scripting languages often drive applications executing on a user PC or workstation having limited computing resources. A client/server architecture may be imposed to provide a conventional host (server) on which to invoke operations that may be computationally infeasible or undesirable to execute locally on the client. Unfortunately, conventional web scripting languages suffer from the shortcoming that each exchange with the server is performed individually, often with exchange of substantial data items and control information. Configurations herein are based, in part, on the observation that such server operations are often invoked in a sequence on the same or similar data object. A conventional sequence of invoked server operations often finds the requestor retransmitting an object from a previous operation back to the server for a successive operation. Configurations herein substantially overcome the shortcoming of redundant bandwidth usage from successive server library invocations by defining a set of operations in a batch script file and transmitting the batch script file along with the object such that the server operates on the batch file rather than retransmitting the data object back to the requestor for each invocation.

The server side scripting language hosts batch requests from a client for invoking object specific libraries on the server. The requestor executes a user application driven by a web scripting language. The requestor may not itself have facilities or resources for efficiently invoking certain operations that are provided by the server. A batch script enables the requestor to invoke a set of server operations in batch, without exchanging requests and result for each invocation of a service side operation, thus mitigating the bandwidth that would otherwise occur for individual client/server exchanges for each operation. The server provides a proxy class for expected object types and operations, and a dispatch layer identifies the appropriate proxy class for each operation requested from the batch script. Conventional approaches require manual identification and invocation of a specific proxy class for performing the requested operation. The server identifies and dispatches the requested operation to a corresponding proxy component in succession from the batch script.

In further detail, the system and method described below includes identifying, in a batch script, a plurality of operations for applying to an object, such that the operations are performed by a server in a scripting infrastructure for invoking the batch script, in which the server is remote from a requester of the operations which are invokable via a library from the server. The server transforms the object to a server format responsive to the operations performed on the server, and executes, via a proxy component, each of the identified operations. For each of the identified operations, the server determines an object type indicative of the information in the object and a set of the operations applicable to the object type, identifies a proxy component responsive to the transformed object for performing a particular operation of the identified operations, and dispatches the object to the identified proxy component to perform the identified operation and generate a proxy result. The server applies a subsequent operations from the plurality of operations on the proxy result by iterating the determining, identifying and dispatching for remaining identified operations in sequence from the batch script, and returns, upon completion of the identified operations, the proxy result to the requestor.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

User applications often invoke libraries in a client/server manner. Web scripting applications provide library invocation over a network infrastructure, most notable the Internet. In a managed application environment, a client/requestor invokes the library via a server in a host based web scripting arrangement. In such an environment, developers often invoke so-called ColdFusion operations from the web scripted application to take advantage of robust operations provided by the server. In such a managed application environment, applications often find it beneficial to invoke certain operations via a library at a centralized server. Typically, the server has additional computing resources than a remote requestor (i.e. client) of the operation, and/or access to a library of operations or functions that are inaccessible from the requestor alone.

Depicted below are descriptions and examples of a requestor executing an application in a client/server arrangement with a central server (server) having a library of operations. While conventional approaches receive requests for library operations in a piecemeal manner from the requestors (i.e. clients), configurations herein perform the requested library operations (operations) in batch mode from a batch script. In contrast to a piecemeal approach in which requestors or clients send individual library requests and receive transmitted responses, the batch script allows specification of multiple library operations in sequence on a particular data item, thus mitigating bandwidth requirements for transmitting individual library requests and responses. The batch script identifies a data item and a set of operations to perform, and the server receives the data item and performs a sequence of the requested operations on the data item without transmitting and receiving the operation requests and data items successively for each library operation. A single batch result representing the cumulative application of the set of batch operations returns to the client following invocation of the requested library operation from the batch script.

Figure 1:
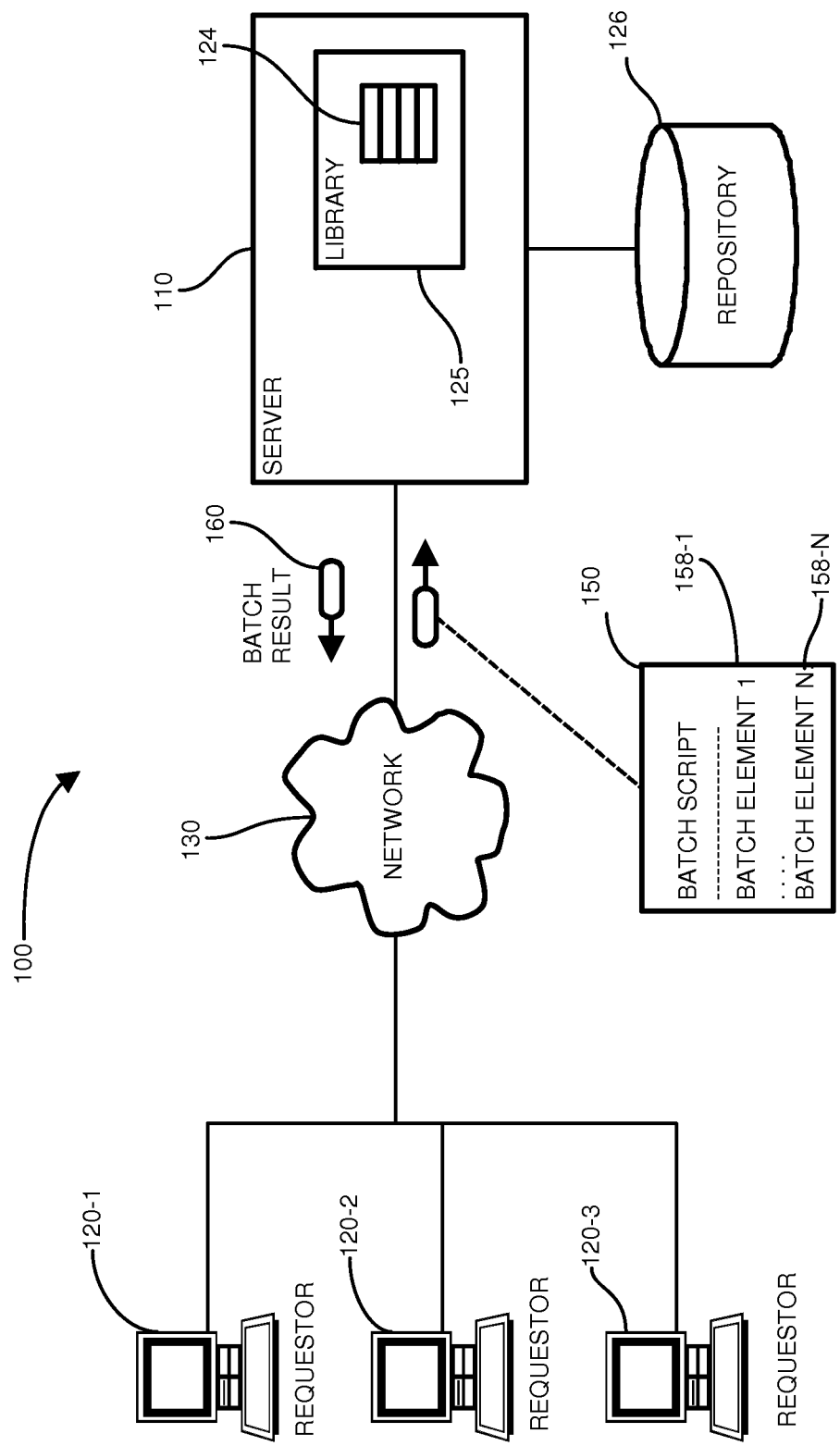
FIG. 1 is a context diagram of a managed application environment suitable for use with the present configuration.

FIG. 1 is a context diagram of a managed application environment 100 suitable for use with the present configuration. Referring to FIG. 1, the managed execution environment 100 includes a server 110 coupled to one or more requestors 120-1 . . . 120-3 (120 generally) coupled via a network 130 for providing an interface between the requestor 120 and the server 110. The server 110 has a library 125 of operations 124 for invocation by the requestors 120 as a batch script 150. The server 110, responsive to the batch script 150, invokes the operations 124 in the library 125, which may in turn invoke a repository 126 for related functions and data. The batch script 150 includes a set or list of batch elements 158-1 . . . 158-N identifying the requested operations 124. Each batch element 158 is an indication of an operation to perform, a data item, and any parameters required for the operation to be executed on the data item. Specification as a set of elements 158-1 . . . 158-N in the batch script 150 relives the need for a client/server exchange with the requestor 120 for each operation. The network 130 provides the client/server coupling between the requestors 120 (clients) and the server 110 for transmitting the batch script 150 and corresponding batch result 160, and may include a LAN, WAN, intranet, as well as the Internet or other suitable interconnection for connecting the requestors 120 and the server 110. Upon completion of the operations 124 identified in the batch script 150, the network 130 transports the batch result 160 to the requestor 120 that initiated the batch script 150, now described in further detail.

For example, shown below is a code segment invoking proxy elements 158 for object types including a chart and a pdf. Batching the requested operations 124 across these proxy classes allows users and/or developers to design an application that generates a chart based on the information provided by the user, manipulate the chart image, generate a pdf out of the image, add a watermark to the generated pdf, protect the pdf and send a mail with the pdf as an attachment:

Var batch:Batch=new Batch( )
Batch.attributes=[{Chart: {source: chartdata, action:"generate"}}, {Image: {action:"addborder",color:"Red", thickness:"50"}}, {Document: {action:"pdf"}}, {Pdf: {action:"protect", password:"abc"}}]

Figure 2:
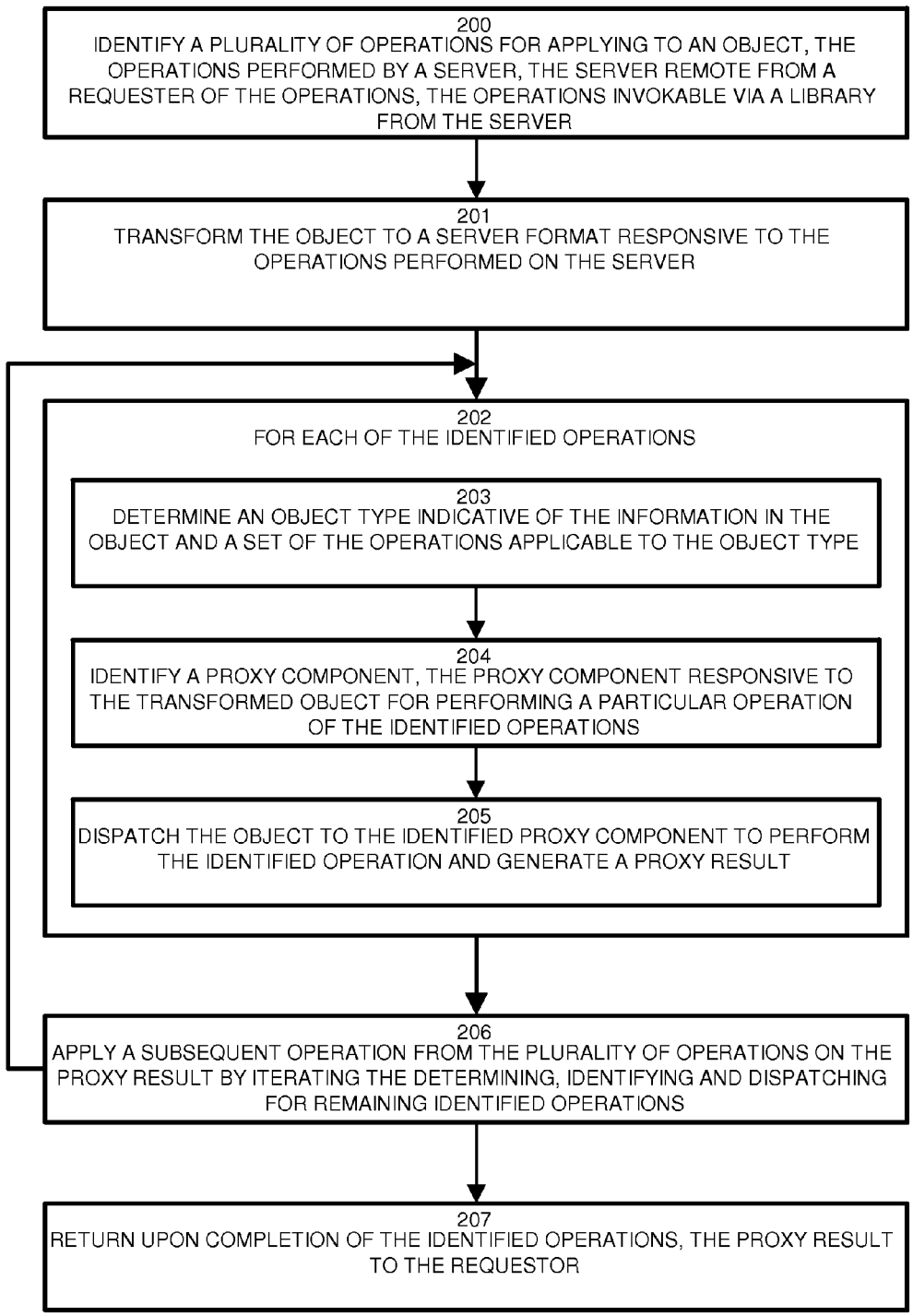
FIG. 2 is a flowchart of batch proxy class processing in the environment of FIG. 1.
Figure 3:
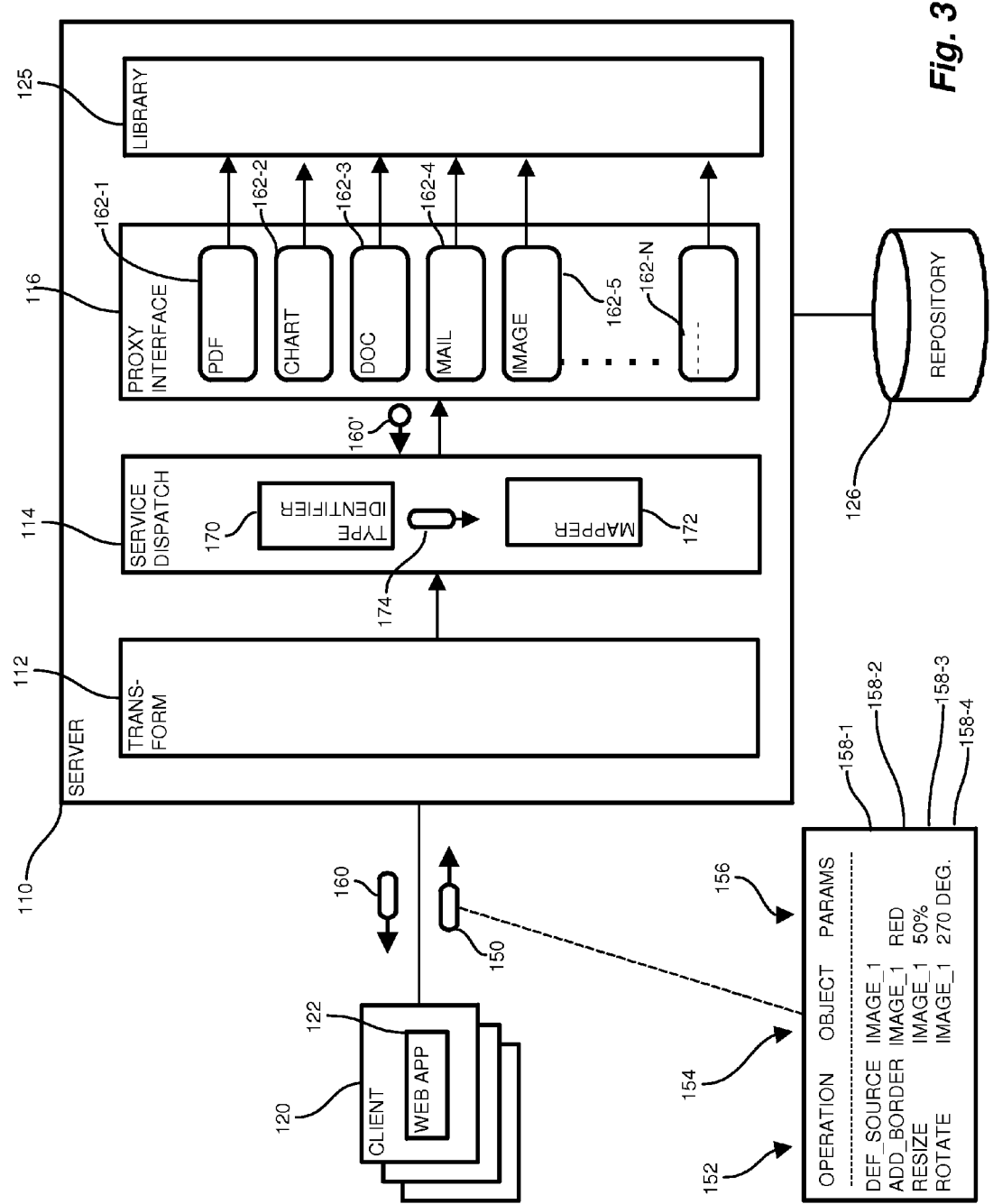
FIG. 3 is a block diagram of batch proxy class invocation as in the flowchart of FIG. 2.
Figure 4:
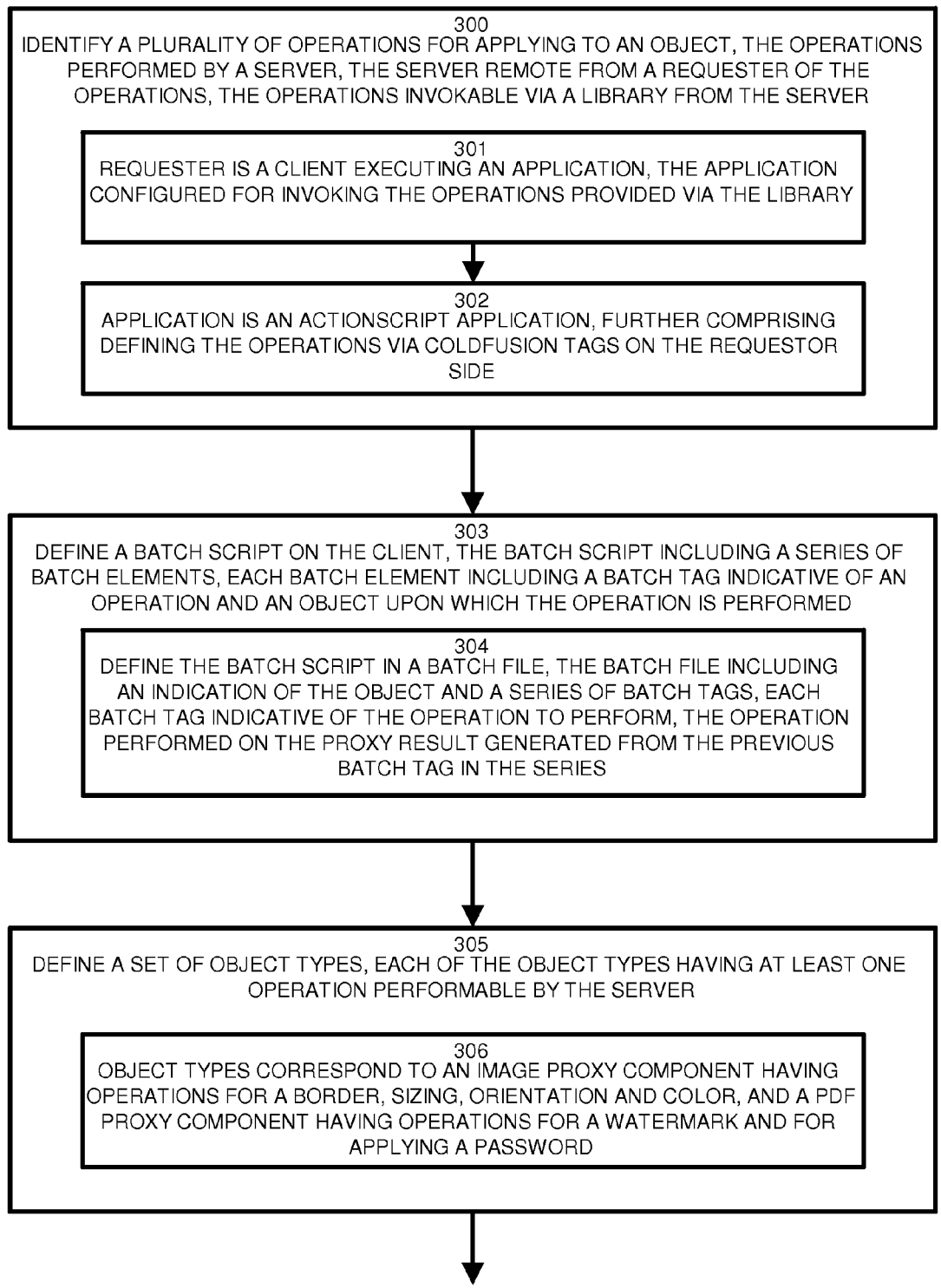
FIGS. 4-7 are a flowchart of batch file processing in the system of FIG. 3.
Figure 5:
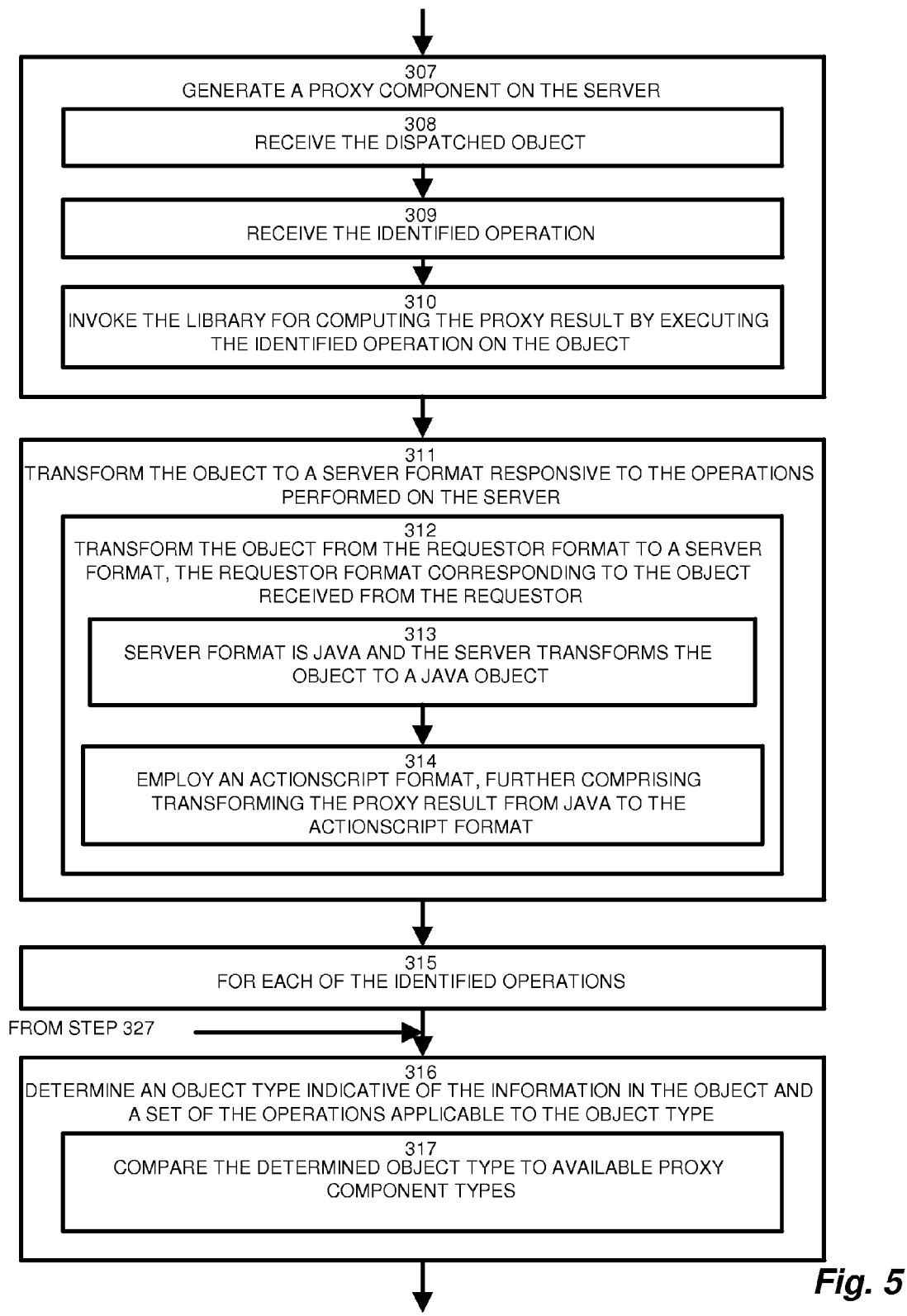
Figure 6:
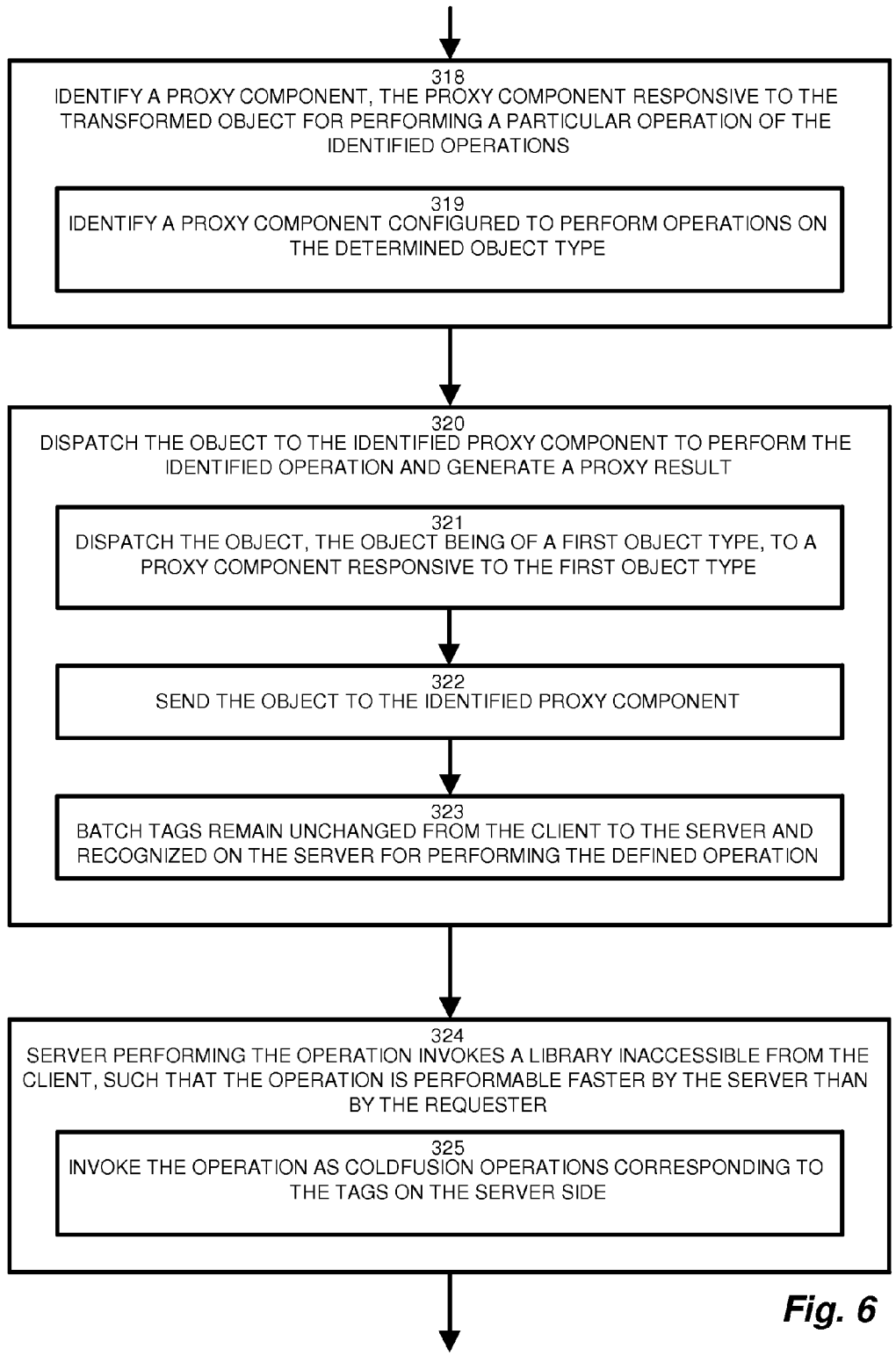
Figure 7:
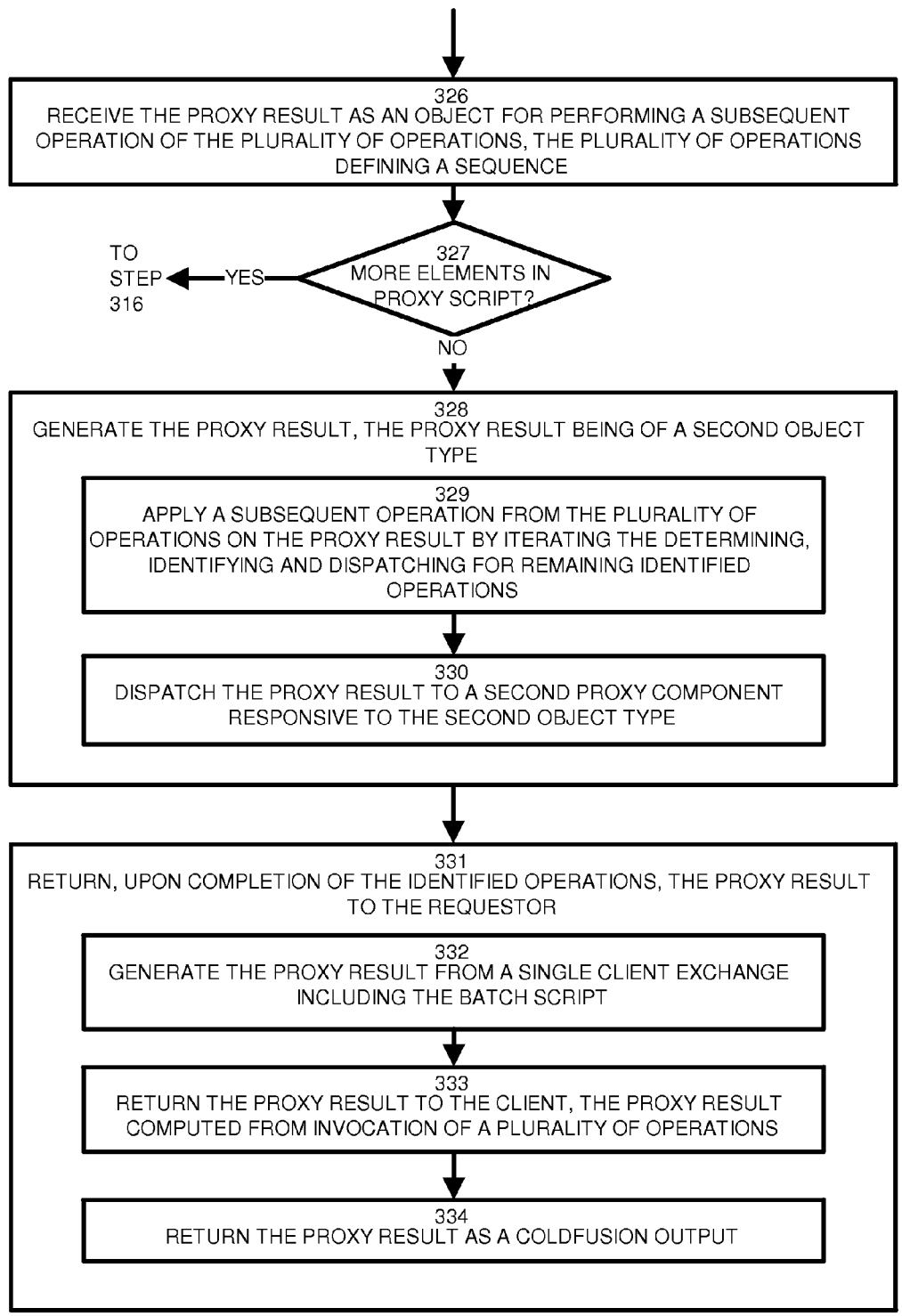

FIG. 2 is a flowchart of batch proxy class processing in the environment of FIG. 1. Referring to FIGS. 1-3, at step 200, the method for invoking batch proxy classes as defined herein includes identifying a plurality of operations 124 for applying to an object 154, in which the operations 124 are performed by the server 110, and such that the server is remote from the requester 120 (i.e. client) of the operations 124. Typically, the requestor 120 and server 110 operate in a hosted environment for web services such as a client/server arrangement in which the operations 124 are invokable via the library 125 from the server 110. Upon receipt of the object 154 designated by the batch script 150 (discussed further in FIG. 3, below), the server 110 transforms the object to a server format responsive to the operations performed on the server 110, as depicted at step 201. Operating on the batch script 150, the server 110 iterates through each batch element 158 and, at step 202, for each of the identified operations 152 of each element 158, the type identifier 170 in the server 110 determines an object type 174 indicative of the information in the object 154 and a set of the operations 124 applicable to the object type, as disclosed at step 203. Based on the determined object type 154, the mapper 172 identifies a proxy component responsive to the transformed object for performing a particular operation 124 of the identified operations, as depicted at step 204. Each proxy component 162 in the proxy interface 116 includes operations applicable to a particular object type, such as the pdf, chart, document, mail and image types shown. Further, since the specified operation 152 may alter the object type, the service dispatch reevaluates the object 154 type after each operation to invoke the appropriate proxy component 162.

The service dispatch layer 114 (FIG. 3) dispatches the object 154 to the identified proxy component 162-N to perform the identified operation and generate a proxy result, as shown at step 205, continuing for each proxy element 158. Upon completion of an operation 158-N, the service dispatch invokes operation 158-(N+1) and applies subsequent operations from the plurality of operations on the proxy result by iterating the determining, identifying and dispatching for remaining identified operations, as shown at step 206, iterating to perform each operation 152 without a need to return the resultant object to the requestor until all operations from the batch script 150 have completed. The server 110 then returns, upon completion of the identified operations, the proxy result 160 to the requestor 120

FIG. 3 is a block diagram of batch proxy class invocation as in the flowchart of FIG. 2. Referring to FIGS. 1 and 3, the server 110 further includes a transform layer 112, a service dispatch layer 114 and a proxy interface layer 116, discussed further below. The batch script 150 includes a plurality of batch elements 158-1 . . . 158-3 (158 generally), each of which includes an operation 152, an object 154 and parameters 156. Each batch element operates in sequence using the result of the previous operation 124, so the object may be implied as the result of the previous operation. The operation specifier 152 is an indicator of the requested operation 124 to be performed by the server 110. The object 154 specifies a data item, such as an image, pdf, or uniform resource locator (URL) indicating the data upon which the operation is to be performed. The parameters 156 indicate any parameters required by the operation, such as a color to draw or a percentage of rotation, and may be null.

The service dispatch layer 114 identifies and invokes an appropriate component 162 (discussed below) in the proxy interface layer 116 for performing the operation 152 specified by each batch element 158. The proxy interface layer 116 includes a component 162-1 . . . 162-N or each type of object 154 that may be specified in a proxy element 158, such as an image, document, pdf, chart, and others as defined by the available proxy components 162.

The transform layer 112 transforms, or translates, between differing requestor 120 and server 110 processing formats. In the example shown, the requestor operates in a requestor format such as ActionScript and the server operates in a server format such as ColdFusion. The transform layer 112 transforms data and commands specifying the operations 124 between different formats, protocols, or languages employed between the client (requestor) 120 and server 110. The service dispatch layer 114 includes a type identifier 170 and a mapper 172. The type identifier 170 identifies the type of object sent by the client 120, and the mapper determines the appropriate component 162 for handling the object type 174. The dispatch later 114 thus sends the object 154 to the corresponding component 162-N in the proxy interface layer 116 based on the object type 174 received by the mapper 172.

Each component 162 in the proxy interface layer 116 is suited to performing operations 124 on a particular object type 174, based on a particular proxy class. In the example shown, the proxy classes, and thus the proxy components 162, include a PDF component 162-1, a chart component 162-2, a document component 162-3, a mail component 162-4, and an image component 162-5. Other components 162-N may be developed corresponding to other proxy classes.

The batch script 150, in the example shown in FIG. 3, includes batch elements 158-1 . . . 158-4, as outlined above. The requested batch operations define an input image, specify the color red for a border, resize 50%, and rotate sideways. An example batch script syntax is as follows:

Var img:Image=new Image( )
Img.action="batchoperation";
Img.attributes=[{source:byteArrayIfImage},{AddBorder: {color:"Red",thickness:"50"}},{Resize {width:"50%", height:"50%",interpolation:"Blackman",blurfactor:"2"}}, {Flip:{transpose:"270"}}];
Img.execute( )'

The above example illustrates a segment of ActionScript code that first creates the image proxy class. Then set the operation to a batch operation. Attributes have been set on the proxy class to pass the byte array of the image followed by sequential operations that have to be performed on the image. The operations indicated above will first add a border, then resizing the image and finally flip the image. The resulting image at the end is sent back to the client, thus reducing both the number of requests and amount of data server.

A further feature allows the server format tags to be employed directly from the client, thus avoiding a mapping of syntax terms between the requestor format and the server format. In other words, client application developers using ActionScript may find it beneficial to invoke ColdFusion operations and libraries on the server side by specifying the ColdFusion tags in a batch, or list, manner to minimize overhead but using the same tag syntax from the client (requestor) side.

FIGS. 4-7 are a flowchart of batch file processing in the system of FIG. 3. Referring to FIGS. 3-7, the requestor 120 identifies a plurality of operations 152 for applying to an object, such that the operations are performed by a server 110 remote from the requester 120 of the operations, in which the operations 124 are invokable via a library 125 from the server, as shown at step 300. In the example arrangement, the requestor 120 executes a rich Internet Application (RIA) driven by a web scripting language such as ActionScript, and the server 110 facilitates invocation of computationally intensive library 125 calls by invoking operations via a server side language such as ColdFusion. The requester 110 is a client executing an application 122, such as a web scripting application in which the application is configured for invoking the operations 124 provided via the library 125, as depicted at step 301. In the example configuration shown, the application 122 is an ActionScript application, and the proxy script further includes defining the operations 124 via ColdFusion tags on the requestor side, as depicted at step 302. Thus, the requestor 120 embeds the ColdFusion responsive tags in the script 150, and the same tags are received and interpreted at the server side, as discussed further below.

The identified commands are defined the batch script 150 on the client 120 (requestor), such that the batch script 150 includes a series of batch elements 158 in which each batch element 158 includes a batch tag indicative of an operation 152 and an object 154 upon which the operation 152 is to be performed, as depicted at step 303. Further, since the batch file includes an indication of the object 154 and a series of batch tags 152, in which each batch tag is indicative of the operation 154 to perform, the operation performed in the series is performed on the proxy result 160' generated from the previous batch tag in the series, as disclosed at step 304. Therefore, the output of a particular operation 124 provides input to the next operation 154 in the series, possibly on an object of a different type.

The server 110 therefore defines a set of object types, in which each of the object types has at least one operation 124 performable by the server 110, as shown at step 305. In the configuration shown, for example, defined object types correspond to an image proxy component having operations for a border, sizing, orientation and color, and a pdf proxy component having operations for a watermark and for applying a password, as depicted at step 306.

Prior to receiving the batch script file 150, a proxy component 162 is generated on the server 110, as depicted at step 307. The proxy component 162 is specific to a particular type of object 154, such as a document, image, or pdf, and performs the operations 124 on the object 154 that are requested in the batch script file 150. Accordingly, the server has a proxy interface 116 including a proxy component 162 for each object type for which the server 110 supports an operation 124. Each of the proxy components 162 is configured to receive the dispatched object 154, as shown at step 308, receive the identity of the identified operation 152 from the script file 150, as depicted at step 309, and invoke the library 125 for computing the proxy result 160 by executing the identified operation 124 on the object 154, as shown at step 310.

In the example configuration, the requestor 120 operates in a requestor format, or web scripting language, and the server operates in a different server format, or server side scripting language. In the example shown, the requestor 120 executes an ActionScript application and the server 110 employs Java for invoking ColdFusion operations. Upon receiving the batch script file 150, the transform layer 112 transforms the object 154 to the server format responsive to the operations 124 performed on the server 110, as depicted at step 311. This includes transforming the object 154 from the requestor format to a server format, in which the requestor format corresponds to the object received from the requestor, as disclosed at step 312. For example, in the case of an image object type, the requestor 120 may employ a byte array and the java representation on the server 110 may expect a jpeg format. In the example configuration, the server format is java and the server transforms the object to a java object, as depicted at step 313. The requestor 120 employs an ActionScript format, such that the transform layer 112 is configured to transform the proxy result 160 from java to the ActionScript format following execution of the batch script 150, as depicted at step 314.

After transforming, at step 315, for each of the identified operations 152 from the batch script file 150, the type identifier 170 determines an object type 174 indicative of the information in the object 154 and a set of the operations 124 performed by the corresponding component 162 applicable to the object type, as shown at step 316. The type identifier 170 compares the determined object type to available proxy component types, as depicted at step 317. The mapper 172 receives the type identifier 170 and identifies a proxy component 162, such that the proxy component 162 is responsive to the transformed object 154 for performing the particular operation 152 of the identified operations 124, as depicted at step 318. Thus, the mapper 172 identifies a proxy component 162 configured to perform the specified operation 152 on the determined object type, as shown at step 319.

The service dispatch layer 114 dispatches each element 158 of the batch script to the corresponding proxy component 162 based on the type 174. Therefore, based on the type 174 identified by the mapper, the dispatch layer 114 dispatches the object 154 to the identified proxy component 162 to perform the identified operation 154 from the batch script 150 and generate a proxy result 160, as shown at step 320. In the example configuration, a plurality of elements 158 from the batch script 150 result in successive dispatches for each proxy result 160 from the previous operation 124. In other words, the service dispatch layer 114 dispatches the object 154, in which the object is of a first object type, to a proxy component 162 responsive to the first object type, as depicted at step 321, and sends the object to the identified proxy component, as shown at step 322. Objects 154 from successive elements 158 are dispatched in a similar manner using the object or a reference thereto from the previous operation 124. The object 154 may be raw data or a URL reference, for example, or other suitable value or reference mechanism. A particular feature of the elements 158 allows the batch tags to remain unchanged from the requestor 120 to the server 110 and are recognized on the server for performing the defined operation 124, as shown at step 323. Thus, developers and users may employ the same labels for operations 124 in the batch script on the requestor 120 side. The syntax or format will not be scrutinized or unrecognized by the requestor 120.

As indicated above, the server 110 performing the operation 152 typically invokes a library 125 inaccessible from the client requestor 110 such that the operation 124 is performable faster by the server 110 than by the requester 120, as depicted at step 324. Often, the incentive to invoke the server 110 is an increased performance for computationally intensive tasks such as watermarking. In a particular configuration, the server 110 invokes ColdFusion operations corresponding to the tags on the server side, but provided in the batch script 150 at the requestor 120 side, as shown at step 325.

An intermediate proxy result 160' returns from each invocation of a batch component 162 by the service dispatch 114 resulting from a batch element 158 in the batch script file 150. Thus, the server 110 receives the proxy result 160' as an object for performing a subsequent operation of the plurality of operations 152, the plurality of operations defining a sequence 158-1 . . . 158-N of elements from the batch script 150, as depicted at step 326. Accordingly, a check is performed, at step 327, to determine if there are additional elements 158 in the proxy script 150.

For each additional script element 158, the proxy interface 116 generates an intermediate proxy result 160', in which the intermediate proxy result may be of a second object type, as shown at step 328. This includes applying a subsequent operation 152 from the plurality of operations on the proxy result 160' by iterating the determining, identifying and dispatching for remaining identified operations 152, as depicted at step 329, and dispatching the proxy result 160' to a second proxy component 162 responsive to the second object type, as disclosed at step 330.

After iterating though each proxy element 158, the server 110 returns, upon completion of the identified operations, the proxy result to the requestor 120, as depicted at step 331. The proxy result 160 is thus generated from a single client exchange including the batch script 150, as depicted at step 332. The server 110 returns the proxy result 160 to the client, such that the proxy result has been computed from invocation of a plurality of operations 152 from the batch script 150, as shown at step 333. In the example arrangement, the server 110 returns the proxy result 160' as a ColdFusion output, as depicted at step 324.

Those skilled in the art should readily appreciate that the programs and methods for batch proxy class invocation as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for batch proxy class invocation has been particularly shown and described with references to embodiments thereof, it will be understood by those skilled in the art that various changes in form and details may be made therein without departing from the scope of the invention encompassed by the appended claims.

What is claimed is:

1. A method comprising:
    identifying a plurality of operations for applying to an object, the operations performed by a server, the server remote from a requester of the operations, the operations invokable via a library from the server;
    transforming the object to a server format responsive to the operations performed on the server;
    for each of the identified operations:
        determining an object type indicative of the information in the object and a set of the operations applicable to the object type;
        identifying a proxy component based at least in part on the object type, the proxy component responsive to the transformed object of a particular object type and the proxy component configured for performing a particular operation of the identified operations;
        dispatching the object to the identified proxy component to perform the identified operation and generate a proxy result; and
        applying a subsequent operation from the plurality of operations on the proxy result by iterating the determining, identifying and dispatching for remaining identified operations; and
    returning, upon completion of the identified operations, the proxy result to the requestor.

2. The method of claim 1 further comprising:
    transforming the object from the requestor format to a server format, the requestor format corresponding to the object received from the requestor.

3. The method of claim 2 further comprising:
    generating the proxy result from a single client exchange including a batch script; and
    returning the proxy result to the client, the proxy result computed from invocation of the plurality of operations.

4. The method of claim 3 wherein dispatching further comprises:
    comparing the determined object type to available proxy component types;
    identifying a proxy component configured to perform operations on the determined object type;
    sending the object to the identified proxy component; and
    receiving the proxy result as an object for performing a subsequent operation of the plurality of operations, the plurality of operations defining a sequence.

5. The method of claim 2 wherein the application is an ActionScript application, further comprising
    defining the operations via CFML tags on the requestor side;
    invoking the operations as CFML operations corresponding to the tags on the server side; and
    returning the proxy result as a CFML output.

6. The method of claim 5 wherein the server format is java and the server transforms the object to a java object, and
    the requestor employs an ActionScript format, further comprising transforming the proxy result from java to the ActionScript format.

7. The method of claim 1 further comprising:
    defining a set of object types, each of the object types having at least one operation performable by the server; and
    generating a proxy component on the server, the proxy component configured to:
        receive the dispatched object
        receive the identified operation; and
        invoke the library for computing the proxy result by executing the identified operation on the object.

8. The method of claim 7 further comprising:
    dispatching the object, the object being of a first object type, to a proxy component responsive to the first object type;
    generating the proxy result, the proxy result being of a second object type; and
    dispatching the proxy result to a second proxy component responsive to the second object type.

9. The method of claim 7 wherein the object types correspond to an image proxy component having operations for a border, sizing, orientation and color, and a pdf proxy component having operations for a watermark and for applying a password.

10. The method of claim 1 wherein the requester is a client executing an application, the application configured for invoking the operations provided via the library, further comprising:
defining a batch script on the client, the batch script including a series of batch elements, each batch element including a batch tag indicative of an operation and an object upon which the operation is performed,
the batch tags remaining unchanged from the client to the server and recognized on the server for performing the defined operation.

11. The method of claim 10 further comprising defining the batch script in a batch file, the batch file including an indication of the object and a series of batch tags, each batch tag indicative of the operation to perform, the operation performed on the proxy result generated from the previous batch tag in the series.

12. The method of claim 10 wherein the server performing the operation invokes a library inaccessible from the client, such that the operation is performable faster by the server than by the requester.

13. A server comprising:
a batch script indicative of a plurality of operations for applying to an object, the operations performed by a server comprising a processor, the server remote from a requester of the operations, the operations invokable from a requestor via a library from the server;
a transformer in the server for transforming the object to a server format responsive to the operations performed on the server;
the server having a dispatcher responsive to each of the plurality of operations;
a type identifier configured to determine an object type indicative of the information in the object and a set of the operations applicable to the object type;
a mapper configured to identify a proxy component based at least in part on the object type, the proxy component responsive to the transformed object of a particular object type for performing a particular operation of the identified operations;
the dispatcher configured to, for each of the plurality of operations, dispatch the object to the identified proxy component to perform the identified operation and generate a proxy result, and to apply a subsequent operation from the plurality of operations on the proxy result by iterating the determining, identifying and dispatching for remaining operations of the plurality of; and
an interface to the requestor configured to return, upon completion of the identified operations, the proxy result to the requestor.

14. The server of claim 13 wherein the transformer is further configured to receive the object in a web scripting format, and transforming the object to a server format, the server format based on a server side scripting language.

15. The server of claim 14 wherein the server is configured to:
generate the proxy result from a single client exchange including the batch script; and
return the proxy result to the client, the proxy result computed from invocation of the plurality of operations.

16. The server of claim 13 wherein the dispatcher is further configured to:
compare the determined object type to available proxy component types;
identify a proxy component configured to perform operations on the determined object type;
send the object to the identified proxy component; and
receive the proxy result as an object for performing a subsequent operation of the plurality of operations, the plurality of operations defining a sequence.

17. The server of claim 13 wherein the server further includes:
a set of object types, each of the object types having at least one operation performable by the server; and
for each object type, a proxy component, the proxy component configured to:
receive the dispatched object
receive the identified operation; and
invoke the library for computing the proxy result by executing the identified operation on the object such that the operation is performable faster by the library at the server than by the requester.

18. The server of claim 17 wherein the dispatcher is further configured to: dispatch the object, the object being of a first object type, to a proxy component responsive to the first object type;
receive the generated proxy result, the proxy result being of a second object type; and
dispatch the proxy result to a second proxy component responsive to the second object type.

19. The server of claim 13 wherein the batch script is a batch file, the batch file including an series of batch elements, each batch element having indication of the object
and a batch tags, each batch tag indicative of the operation to perform, the operation performed on the proxy result generated from the previous batch element in the series.

20. A computer implemented method on a non-transitory computer readable storage medium encoded as a set of processor based instructions that, upon execution by a processor, cause the computer to perform a method, the method comprising:
identifying, in a batch script, a plurality of operations for applying to an object, the operations performed by a server in a scripting infrastructure for invoking the batch script, the server remote from a requester of the operations, the operations invokable via a library from the server;
transforming the object to a server format responsive to the operations performed on the server;
for each of the identified operations:
determining an object type indicative of the information in the object and a set of the operations applicable to the object type;
identifying a proxy component based at least in part on the object type, the proxy component responsive to the transformed object of a particular object type for performing a particular operation of the identified operations;
dispatching the object to the identified proxy component to perform the identified operation and generate a proxy result; and
applying a subsequent operation from the plurality of operations on the proxy result by iterating the determining, identifying and dispatching for remaining identified operations; and
returning, upon completion of the identified operations, the proxy result to the requestor.

* * * * *